Nov. 26, 1929.   H. C. HODGKINS   1,737,156
VENDING DISPLAY CABINET AND CONTAINER FOR SAID CABINET
Filed April 2, 1925   2 Sheets-Sheet 1

INVENTOR
Harold Curtis Hodgkins
BY
ATTORNEY

Nov. 26, 1929.  H. C. HODGKINS  1,737,156
VENDING DISPLAY CABINET AND CONTAINER FOR SAID CABINET
Filed April 2, 1925   2 Sheets-Sheet 2
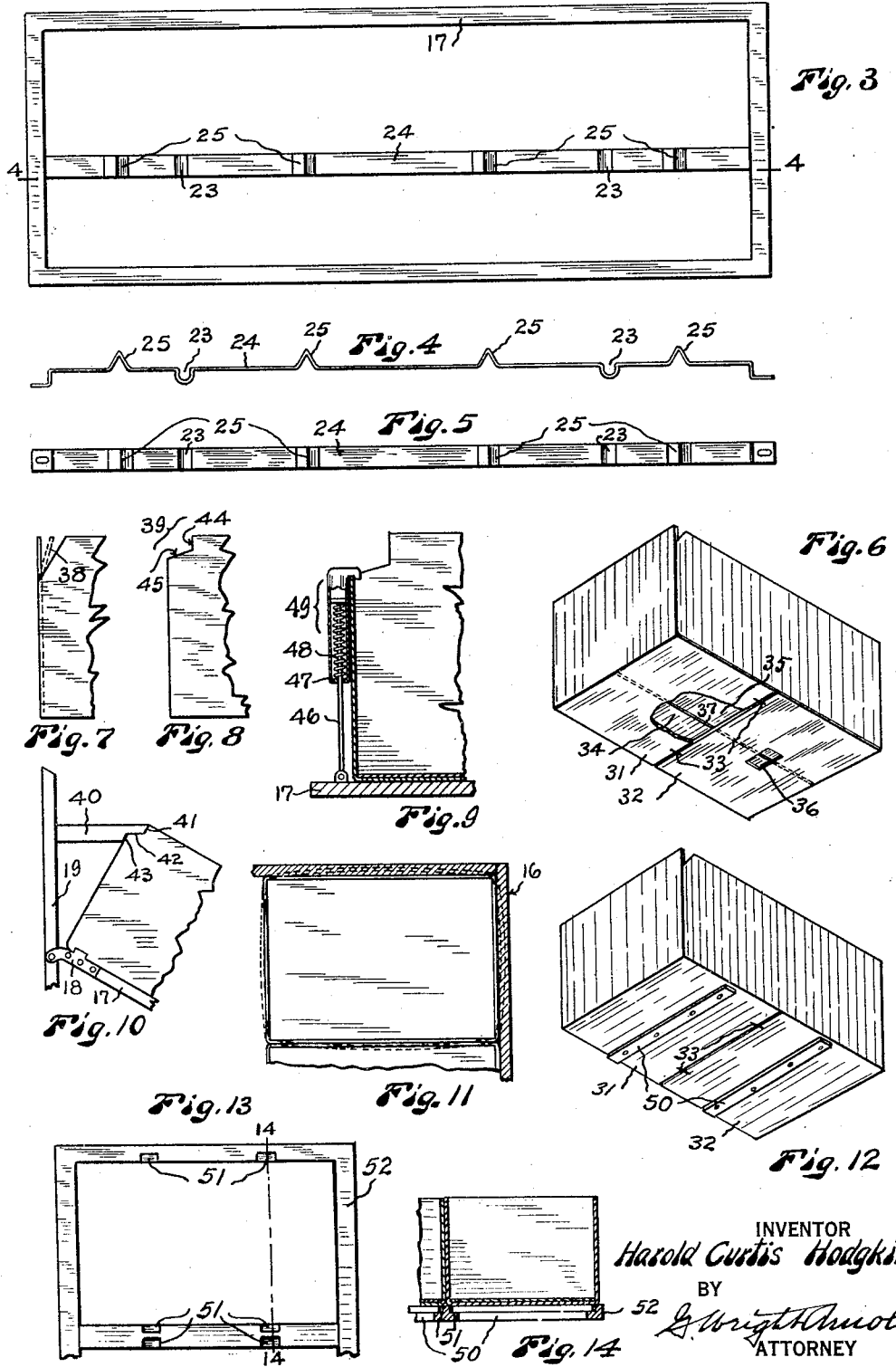
INVENTOR
Harold Curtis Hodgkins
BY
G. Wright Arnold
ATTORNEY Patented Nov. 26, 1929

1,737,156

UNITED STATES PATENT OFFICE

HAROLD CURTIS HODGKINS, OF PORTLAND, OREGON

VENDING DISPLAY CABINET AND CONTAINER FOR SAID CABINET

Application filed April 2, 1925. Serial No. 20,138.

My invention relates to a vending display cabinet and a container for said cabinet. More particularly, my invention relates to a vending display cabinet having a movable supporting member and a container adapted to be fixedly held and sealed in said cabinet against both dust and moisture.

A primary purpose of my invention is to provide a display cabinet characterized by its positive protection against unsanitary conditions.

Moreover, the act of opening a display cabinet ordinarily imparts some movement to the container, which heretofore rests unsecured upon the container supporting member. Such container, when filled with said goods, weighs from six to fourteen pounds. In moving the container into open position, considerable momentum is developed, so that it may become dislodged from its proper position owing to the ensuing shock. This is highly objectionable, particularly because said container and operating parts of the cabinet are made to fit to a high degree of nicety, (as close as one-sixty-fourth to one-thirty-second of an inch),—all to the end that said cabinet will be sealed when in closed position. With the container even slightly out of its proper position, the act of closing the cabinet is unimpeded until towards the end of the throw, and then the striking of the container against parts of the cabinet results in severe straining, if not complete rupture of the container supporting member mountings. When the discovery is made that the container has been thus dislodged, the operator may have to re-open the cabinet and adjust the container, so that the cabinet may be tightly closed. Such delay is particularly objectionable with a number of customers waiting to be served. The repeated striking of the dislodged container results in such opening of the joints of the mounting fixtures that the cabinet is no longer properly operable and no longer tight against insects and dust. A primary object of my invention is to overcome these highly objectionable results.

Furthermore, many classes of goods, particularly cookies and such pastry articles, absorb moisture from the air. It may be a matter of weeks and even months before the sales result in disposing of the contents of a given container, so that in certain seasons of the year or where there is great humidity in the air, as along the sea-coast, the saleableness of such pastry products is greatly lessened, if not lost, after such goods have been stored for a considerable period of time,—the customer insisting on "freshly baked" goods as opposed to "stale" goods. A primary object of my invention is the provision of a case which will be moisture-tight, and will keep such goods "fresh" and crisp.

The container for pastry consists ordinarily of pasteboard material, and the contents cause a bulging of the box intermediate the corners. This bulging is helpful when the container is used in a vending cabinet as herein set forth, in that it helps provide a sealing for the cookies by making a very tight fit along the sides and the bottom, and it is a purpose of my invention to take advantage of this outwardly directed pressure to provide a tight sealing for the products in the containers. When the cabinet is in closed position, it is manifest that the weight of the cookies, since the container is inclined, will cause the lower end of the box to press outwardly against the front board, and the said bulging will cause the sides of the container to press tightly against the end walls of the cabinet, but this leaves the difficulty of no outwardly directed pressure against the upper end wall. A primary object of my invention is to provide a sealing strip which will press against the said upper end of the container and cause a sealing of the container along the said upper edge, said sealing means so engaging the box as not to come in contact with the contents of the container, and thus complete a sealing on all four of the upper edges of the container.

The above mentioned general objects of my invention, together with others inherent in the same, are attained by the device illustrated in the following drawings, the same being merely preferred exemplary forms of embodiment of my invention, throughout which drawings like reference numerals indicate like parts:

Fig. 3 is an enlarged view in perspective of the container supporting member of said device embodying my invention with parts broken away;

Fig. 4 is a view in side elevation of the preferred form of the container engaging member;

Fig. 5 is a plan view of said preferred form of container engaging member;

Fig. 6 is a view in perspective of the bottom of said container;

Fig. 7 is a view of one end portion of said container showing the preferred form of notch;

Fig. 8 is a view of one end portion of said container, showing a modified form of said notch;

Fig. 9 is a view of said container supporting member, having a modified form of container engaging means, (auto-hood retainer type);

Fig. 10 is a modified form of sealing strip in operative engagement with one end portion of the container having the notch shown in Fig. 8;

Fig. 11 is a diagrammatic sketch, plan view, illustrating the method of sealing the container;

Fig. 12 is a view of a modified form of a container having cleats secured to the bottom thereof;

Fig. 13 is a plan view of a modified form of a container supporting member adapted to receive said modified form of container shown in Fig. 12; and Fig. 14 is a view in section on dotted line 14, 14 of Fig. 13.

Figure 1:
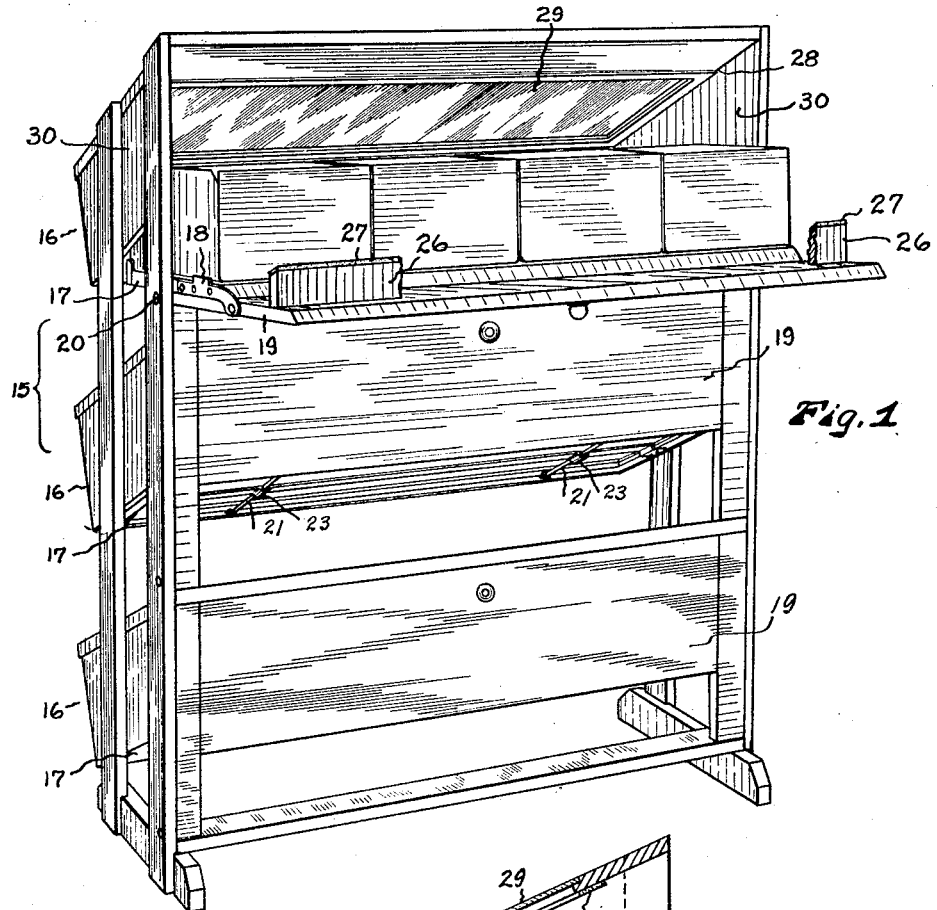
Figure 1 is a view in perspective of a cabinet with one unit in open position showing containers for said cabinet embodying my invention, and also showing sealing strip inside against the top.
Figure 2:
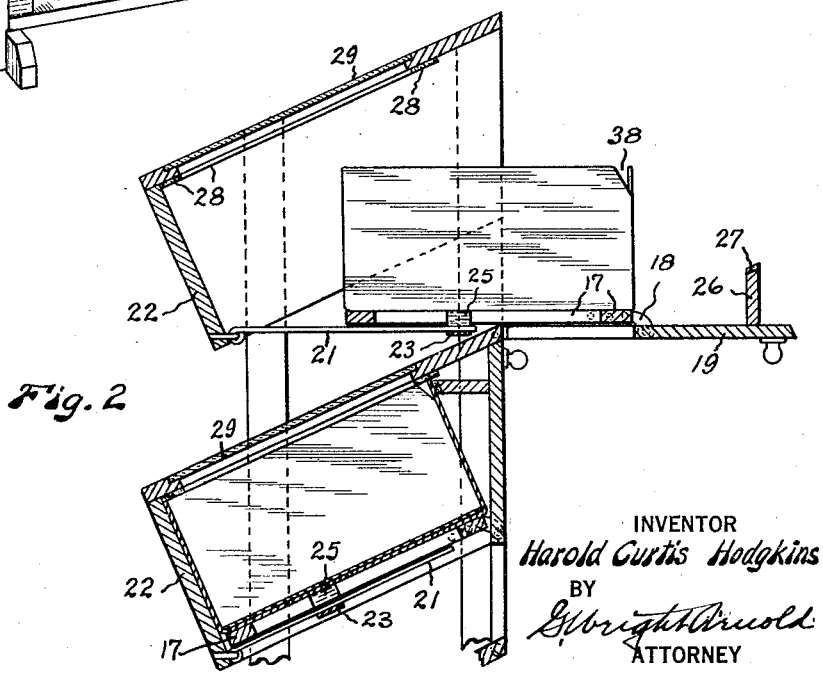
Fig. 2 is a view in longitudinal section of two units of the same in open and closed position, respectively.

A cabinet 15 is provided with drawer units 16, each unit having a container supporting member 17, which is pivotally connected by bracket 18 to the back member 19, which back member in turn is pivotally mounted at 20. The container supporting member 17 is hingedly slidably mounted, preferably by means of rods 21 which are secured as respects one end portion to the front board or plate 22 of the cabinet. These rods 21 are connected to the container supporting member 17 by means of eyelets 23, the rear end of said rods being unconnected. The container supporting member 17 is provided with container engaging means 24, (see Figs. 3, 4 and 5), to which eyelets 23 may be secured or formed as an integral part thereof. The container engaging means preferably has one or more ribs 25, which may be of any desired form but preferably of the V-form shown, for purposes hereinafter set forth. The back member 19 may be provided with a sealing strip 26 which may have a facing 27, such as felt or rubber or the like material.

Top sealing strips 28, preferably having a facing as explained for the sealing strip 26, are preferably provided, secured on the inside of the top of each unit 16, the term "unit" being herein used to designate a single container supporting member and its associated transparent cover 29, end walls 30, front board or plate 22, and back member 19. The term "cabinet" herein includes the apparatus when it consists of a single unit or when it has several units placed in superposed position. The said strips 28 are disposed to make contact with the upper edge of the sides of the containers, which sides are in contact with the end walls and also designed to make contact with the upper edge of the ends of the containers disposed against the front board or plate 22.

Relative to the container part of my invention: A container designed to be used with the cabinet embodying my invention has preferably an outer and an inner bottom. For purposes of definiteness of illustration, my invention will be described as applied to containers formed of paste-board having a gilsonite interior. The containers as at present formed have wings 31 and 32, which together constitute the outer bottom. Said wings are integral with the end walls, and are secured together by staples 33 intermediate the length of said container. The inner bottom is formed by wing members 34 and 35 integral with the sides. The outer bottom of such a container constituting a part of my invention is provided with one or more openings 36 to receive the rib members 25 of the container engaging means 24. The container engaging means may be provided with only one rib as herein illustrated, and this would preferably be located to engage the center of the container. It is manifest that the rib being of V-shape form acts as a guide in positioning the container, and tends to press upwardly in the crack 37 between the wings 34 and 35 of the inner bottom. Therefore, when the container is nearly empty and therefore very light, the stiffness of the material forming the bottoms of the container would not tend to unseat the container from the engaging means 24. If other ribs are provided in the engaging means, they are preferably of a less height than the central rib, as obviously they could not be made to register with any crack such as 37.

Furthermore, the container embodying my invention is preferably provided with a V-shaped notch 38 adjacent the rear end wall, whereby the upper portion of the said end wall is unsupported by the sides, so that it may be pressed forward by the sealing strip 26 secured to the back member 19. In this wise, the sealing strip is caused to exert a pressure against the end wall and it is free to be yieldingly pressed forward. Thus, a sealing contact is effectually made between the facing of the sealing strip and said container upper portion, and at the same time said upper portion acts as a guard against the facing material coming in contact with the edibles within the container.

Thus, it is manifest that the container engaging means 24, which precisely locates and positions the container, cooperates with said sealing strip 26 and the top sealing strips 28 in bringing about the complete sealing of the container, the sides of which container are first pressed into straight lines, i. e., the container is squared to overcome the bulging effect, and the edges caused to engage sealing strips.

A modified form of notch 39 is shown in Fig. 8, wherein the edges of the notch approximate a right angle. Preferably, however, said edges should form an obtuse angle, and a modified form of sealing strip 40, as shown in Fig. 10, is provided with facings 41, 42 and 43, which respectively engage edges 44 and 45 of the notch and end wall of the container.

In Fig. 11 the bulging tendency of the containers is shown in dotted line and the walls of the cabinet, together with the sealing strip, are shown in full lines as the means of providing the high degree of sealing which is provided by my invention, so that the cabinet is not only dust and fly-proof, but also moisture-tight. It is to be remembered that "moisture-tight" may mean the confining of a high degree of moisture within the cabinet if the goods, such as cigars, are of a character which requires a high degree of moisture, as well as the excluding of moisture when the contents of the cabinet are such as to require said exclusion.

In Fig. 9, a modified form of container engaging means is illustrated, the same being of the auto-hood retainer type of clamp 49, consisting of a member 46 which is pivotally secured to the container supporting member 17 and a telescoping member 47 which is connected to said first member 46 by means of a spring 48, said clamp 49 being designed to reach to the top of the rear end wall of the container.

In Fig. 12, a modified form of container is provided with cleats 50. The purpose of said cleats is to operate in conjunction with the grooves 51 disposed in the modified form of container supporting member 52 illustrated in Fig. 13. The grooves are adapted to receive the cleats of the container shown in Fig. 12, and thus, manifestly, keep the container from moving backward or forward or sidewise, i. e., operate as a container retaining means.

The mode of operation of the vending display cabinet embodying my invention has been set forth in part in conjunction with the above description. It must be remembered that the cabinet must be positively tight-fitting in every joint; any dislodgment of the container from its proper place results in jamming of the mechanism, which upon repeated opening and closing produces a great deal of play or opening in the joints, so that the cabinet parts do not function properly and leave openings. By providing a container engaging means, my invention results in a positive positioning of the container when it is placed in the cabinet, and also said means maintains the container in said position against unintentional dislodgment when the cabinet is opened for the removal of some of the contents. From the drawings and from what has already been set forth above, it is clear that the sealing strip 26, which is preferably located on the back member, operates to bring a pressure upon the end wall of the container, which sufficiently guarantees a tight seal as respects this part of the container, which otherwise cannot operate in connection with the cabinet parts to form a seal, because the back member 19 cannot be well used to apply pressure against the end wall. To have said member function in that manner would require providing extra springs and the like, and the strength of said springs would necessarily be relatively great as compared with the pressure necessary to slightly force forward the upper unsupported edge of the container having the preferred form of V-shaped notch. At the same time, the sealing strip, as herein indicated, provides ample pressure between said unsupported upper portion of the container and the facing carried by the said strip. Also, it is desirable to have one side of the container unconstrained by the walls of the cabinet, so that the repeated opening and closing of the cabinet will not result in subjecting the contents to inwardly directed pressure, which might break the brittle pastry contents. Having the rear end wall free of contact with the back member allows this space as a take-up for any laterally directed pressure, or any pressure that may be developed against the front end wall.

Obviously, changes may be made in the forms, dimensions and arrangement of the parts of my invention, without departing from the principle thereof, the above setting forth only preferred forms of embodiment.

I claim:

1. A vending display cabinet embodying a case provided with a transparent cover; a container supporting member hingedly and slidably connected to the case and adapted to be moved to a closed position so as to be open to inspection through the cover and to be drawn out of the case for removal of goods deposited upon it; a back member pivotally mounted to said cabinet; means pivotally connecting said supporting member to said back; a sealing strip disposed on the inside across the top portion of said back member; a container for goods; and means mounted on said supporting member, whereby said container may be fixedly held against unintentional dislodgment during the opening and closing operation of the cabinet, said container being so held as to be engaged by said sealing strip.

2. A vending display cabinet embodying a case provided with a transparent cover; a container supporting member hingedly and slidably connected to the case and adapted to be moved to a closed position so as to be open to inspection through the cover and to be drawn out of the case for removal of goods deposited upon it; a back member pivotally mounted to said cabinet; means pivotally connecting said supporting member to said back; a sealing strip disposed on the inside across the top portion of said back member; a container for goods, having a notch in one end portion; and means mounted on said supporting member, whereby said container may be fixedly held against unintentional dislodgment during the opening and closing operation of the cabinet, said container being so held as to be engaged as respects the said notch by said sealing strip.

3. A vending display cabinet embodying a case provided with a transparent cover; a container supporting member hingedly and slidably connected to the case and adapted to be moved to a closed position so as to be open to inspection through the cover and to be drawn out of the case for removal of goods deposited upon it; a container engaging means disposed on said supporting member; a back member pivotally mounted to said cabinet; means pivotally connecting said supporting member to said back; a sealing strip disposed on the inside across the top portion of said back member; a container for goods, having a notch in one end portion and an opening in the bottom of said container; and means mounted on said supporting member, whereby said container may be fixedly held against unintentional dislodgment during the opening and closing operation of the cabinet, said container being so held as to be engaged as respects the said notch by said sealing strip.

4. In combination with a vending display cabinet, a container operatively disposed in said cabinet, and a container engaging means in the form of a transversely disposed strip having rod eyelets and a raised rib member adapted to protrude into the bottom of said container.

5. In combination with a vending display cabinet having a sealing strip along one end portion and a movable container supporting member having container engaging means, a container embodying a notch adapted to receive said sealing strip.

6. In combination with a vending display cabinet having a sealing strip along one end portion and a movable container supporting member having container engaging means, a container embodying a notch adapted to receive said sealing strip, and means adapted to receive said container engaging means.

7. In combination with a vending display cabinet having a movable container supporting member, a container embodying one end piece of less height than the opposite end piece and the end portions of the sides adjoining said end piece of less height than the remainder of the side portion, and an opening in the bottom of said container, which is adapted to receive an upstanding rib positioning member, whereby, when said container is in closed position, said container may be held securely and sanitarily tightly sealed.

8. In combination with a vending display cabinet having a sealing strip along one end portion and a movable container supporting member having container engaging means, a container having an inner and an outer bottom, the inner bottom being divided longitudinally in the center, said container embodying a notch adapted to receive said sealing strip and said container having an opening in the outer bottom of said container disposed in the longitudinal axis, said opening being adapted to receive said container engaging means.

9. In combination with a vending display cabinet embodying a removable container having an aperture in the bottom thereof, a container engaging means operatively disposed with respect to said aperture of said container, whereby said container may be releasably maintained in operative position.

In witness whereof, I hereunto subscribe my name this 23d day of March, 1925.

HAROLD CURTIS HODGKINS.